United States Patent
Kim et al.

(10) Patent No.: US 7,949,185 B2
(45) Date of Patent: May 24, 2011

(54) METHOD OF PERFORMING ROBUST AUTO WHITE BALANCE

(75) Inventors: Seong Dae Kim, Daejon (KR); Su Jeong Kim, Daegu (KR); Jeong Woo Hwang, Seoul (KR)

(73) Assignee: Korea Advanced Institute of Science and Technology, Deajeon (KR)

( * ) Notice: Subject to any disclaimer, the term of this patent is extended or adjusted under 35 U.S.C. 154(b) by 867 days.

(21) Appl. No.: 11/936,235

(22) Filed: Nov. 7, 2007

(65) Prior Publication Data
US 2009/0097745 A1    Apr. 16, 2009

(30) Foreign Application Priority Data
Oct. 11, 2007   (KR) .................. 10-2007-0102335

(51) Int. Cl.
*G06K 9/00* (2006.01)
*H04N 9/73* (2006.01)

(52) U.S. Cl. .................................. 382/167; 348/223.1
(58) Field of Classification Search .................. None
See application file for complete search history.

(56) References Cited

U.S. PATENT DOCUMENTS

| | | | | |
|---|---|---|---|---|
| 5,223,921 A * | 6/1993 | Haruki et al. | ................. | 348/655 |
| 5,619,347 A * | 4/1997 | Taniguchi et al. | ............ | 358/516 |
| 6,522,353 B1 * | 2/2003 | Saito et al. | ................. | 348/223.1 |
| 6,906,744 B1 * | 6/2005 | Hoshuyama et al. | ...... | 348/223.1 |
| 7,196,724 B2 * | 3/2007 | Suzuki et al. | ............. | 348/223.1 |
| 7,542,077 B2 * | 6/2009 | Miki | ......................... | 348/223.1 |
| 7,750,948 B2 * | 7/2010 | Suzuki | ...................... | 348/223.1 |

* cited by examiner

*Primary Examiner* — Yuzhen Ge
(74) *Attorney, Agent, or Firm* — Adam K. Sacharoff; Much Shelist (57) ABSTRACT

Disclosed herein is a method of performing robust white balance. The method includes a first process of dividing an input image into blocks, a second process of selecting blocks having higher color errors, and calculating average RGB values of the selected blocks, a third process of selecting a specific top percentage of bright blocks, and calculating the average RGB values of these selected blocks, a fourth process of calculating average RGB values through color clustering, a fifth process of converting the average RGB values into CIE xyY color space, a sixth process of calculating the Euclidean distances between the x and y values of standard light sources in a color space and the x and y values of the average RGB values in CIE xyY color space, and selecting an average RGB value having the shortest Euclidean distance (Ed), and a seventh process of calculating white balance gain values using the selected average RGB value, and correcting the input image using the balance gain values.

7 Claims, 8 Drawing Sheets

METHOD OF PERFORMING ROBUST AUTO WHITE BALANCE

BACKGROUND OF THE INVENTION

1. Field of the Invention

The present invention relates to white balance technology that corrects images so that white objects, the colors of which vary with the light source (illumination) when the images are captured using digital cameras, appear white.

2. Description of the Related Art

In general, a human's eyes have the ability to adaptively recognize the colors of object as the original colors thereof regardless of the light source. In contrast, digital cameras distort the original colors of objects depending on the light source that is used when images of the objects are acquired.

For example, when a white object (an object having a white color) is captured in an environment in which the color temperature of the light source is low, an image having a red tint is acquired. In contrast, in an environment in which color temperature is high, an image having a blue tint is acquired. Illumination devices that people use in daily lives have different color temperatures according to the type thereof, and the same solar light varies in color temperature over the passage of time, such as the morning or afternoon. As a result, in the case of digital cameras having no ability to adapt to the colors of light sources, unlike humans, the colors of acquired images differ from the actual colors thereof due to the image acquisition environment. Accordingly, white balance is required for digital cameras.

In general, the term "white balance" in digital cameras refers to the adjustment of optical or electrical gain to form a specific energy distribution of respective wavelengths of R, G, and B under a specific color temperature condition in the case where the energy distribution of R, G and B varies with the color temperature.

Recently marketed digital cameras adopt an 'auto white balance' function, which refers to a function of, when an image is input to the image sensor of a digital camera, analyzing the image and automatically performing white balance without requiring any manipulation on the part of a user.

The effective performance of such auto white balance is dependent on the type of information of an image, acquired through an image sensor, that is used.

Conventional auto white balance methods include a first method of averaging the RGB values of the entire input image or a predetermined part of an image (for example, a region that is in focus) and adjusting a ratio so that the RGB values have the same value, a second method of searching for a white color region of an input image and taking the color in the found region as the color of the light source, and a third method of performing conversion to another color space and utilizing the statistical characteristics of the color signals of an image.

The above-described conventional auto white balance methods are based on assumptions that are made about the color distribution of an image. For images that do not satisfy the set assumptions, the white balance fails or is not performed effectively.

For example, in the case of the first method, an accurate white balance cannot be performed if color distribution is not varied in an acquired image, in the case of the second method, white balance fails if no white color region is present, and, in the case of the third method, the accuracy of white balance is considerably decreased if color distribution is not sufficient in an image or if some colors occupy an excessively large area in proportion to the size of an image.

SUMMARY OF THE INVENTION

Accordingly, the present invention has been made keeping in mind the above problems occurring in the prior art, and an object of the present invention is to provide a method that is capable of increasing the accuracy and reliability of white balance even in the case where color distribution is not varied in an acquired image or no white color region is present in an acquired image.

In order to accomplish the above object, the present invention provides a method of performing robust white balance, including a first process of dividing an input image into a plurality of blocks; a second process of selecting blocks having higher color errors with respect to surrounding blocks, and calculating average RGB values of the selected blocks; a third process of selecting a specific top percentage of bright blocks, and calculating the average RGB values of these selected blocks; a fourth process of calculating average RGB values by performing color clustering on the blocks based on the similarity of color information; a fifth process of converting the average RGB values into CIE xyY color space; a sixth process of calculating the Euclidean distances (Eds) between the x and y values of standard light sources in a color space and the x and y values of the average RGB values in CIE xyY color space, and selecting an average RGB value having the shortest Euclidean distance (Ed); and a seventh process of calculating white balance gain values for R, G, and B using the selected average RGB value, and correcting the input image using the balance gain values.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The detailed features and advantages of the present invention will be apparent from the following description, which will be made in conjunction with the accompanying drawings. Meanwhile, it should be noted that, if it is determined that detailed descriptions of well-known functions and related constructions of the present invention may make the gist of the present invention obscure, the detailed descriptions may be omitted below.

Figure 1:
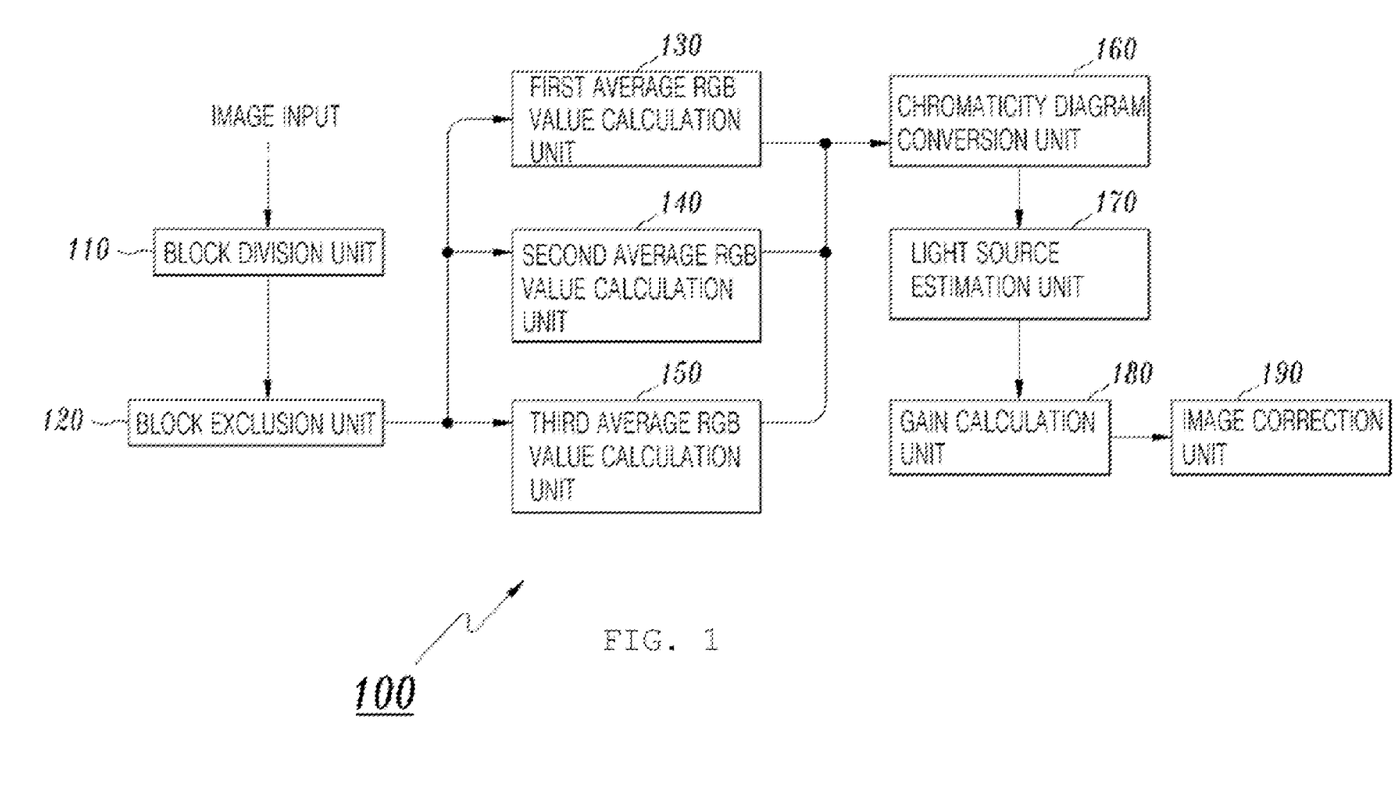
FIG. 1 is a diagram showing the construction of a device for performing robust auto white balance according to the present invention.

FIG. 1 is a diagram showing the construction of a device 100 for performing robust auto white balance according to the present invention. As shown in the drawing, the white balance device 100 of the present invention includes a block division unit 110, a block exclusion unit 120, a first average RGB calculation unit 130, a second average RGB calculation unit 140, a third average RGB calculation unit 150, a chromaticity diagram conversion unit 160, a light source estimation unit 170, a gain calculation unit 180, and an image correction unit 190.

Figure 2:
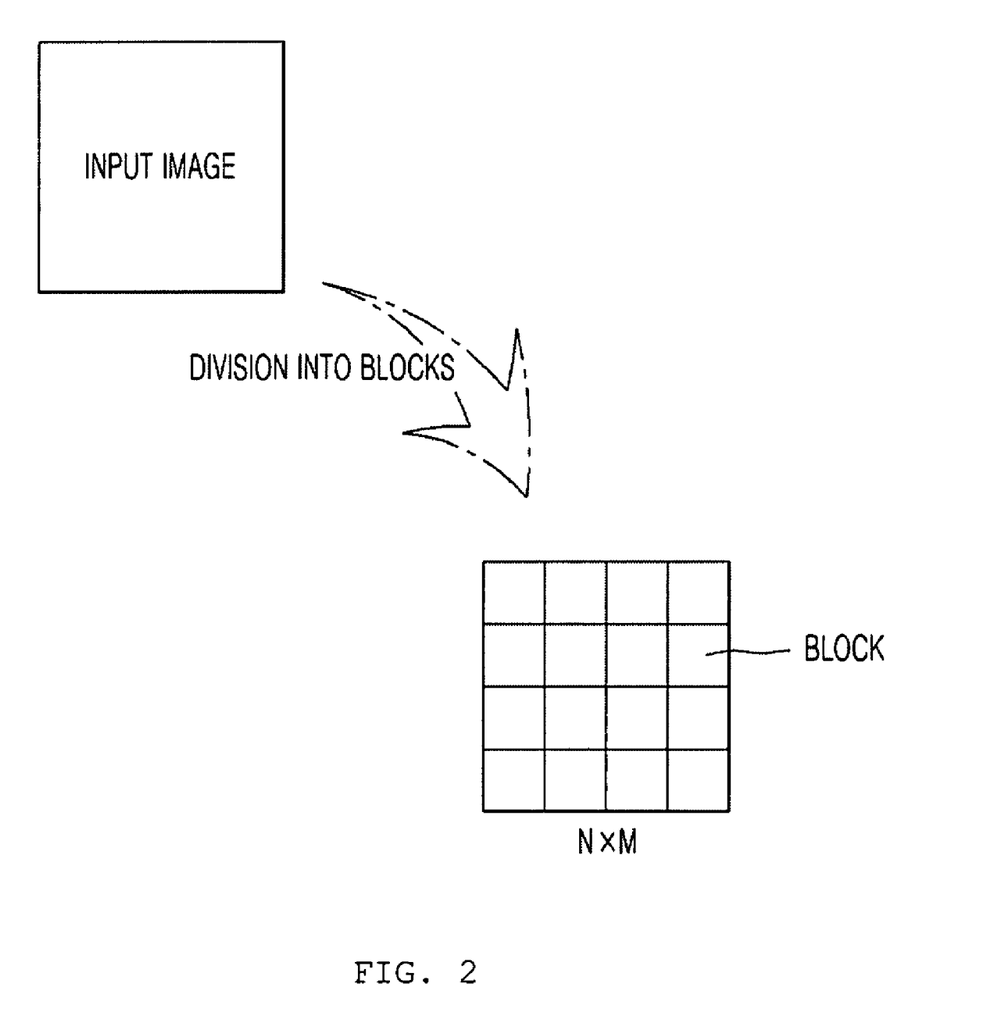
FIG. 2 is a diagram showing the division of an image according to the present invention.

In detail, the block division unit 110 divides an input image into M×N blocks, as exemplified in FIG. 2. The reason for dividing the image into a plurality of blocks is to reduce the processing time.

The block exclusion unit 120 excludes blocks having brightness values lower than a threshold reference brightness value from the resulting blocks. In this case, if any one of the R, G and B values of each block is less than the threshold reference brightness value, the block is considered to be a block having a low brightness value (or to be noise), and the corresponding block is excluded. For reference, the 'threshold reference brightness value' varies with the value of auto exposure information that is set for a digital camera when an image is acquired. That is, the threshold reference brightness value is low in the case where an image is acquired in a situation in which illumination is dark, while it is high in the case where illumination is sufficient.

The color information of an image, that is, the average RGB values of the remaining blocks, required for the performance of white balance, is extracted from the blocks that remain after the operation of the block exclusion unit 120, as described above. In this operation, the average RGB values are calculated through three processes (algorithms) based on the features of the present invention. These three algorithms are respectively performed by the first average RGB calculation unit 130, the second average RGB calculation unit 140, and the third average RGB calculation unit 150, as shown in FIG. 1.

First, the first average RGB calculation unit 130 selects only blocks having higher color errors with respect to surrounding blocks, and calculates the average RGB values of the selected blocks. In greater detail, color errors between a current block and eight surrounding blocks are calculated. Here, the color errors are defined by the following Equation 1:

$$D(B_{mn}, B_{i,j}) = \sqrt{(R-R')^2 + (G-G')^2 + (B-B')^2} \quad (1)$$

where $B_{i,j}$ is the current block, R, G, and B are the average R, G, and B values of the current block, $B_{mn}$ is the surrounding blocks (neighboring blocks), and R', G', and B' are the average R, G, and B values of the surrounding blocks.

The first average RGB calculation unit 130 selects a block if the number of surrounding blocks having color errors, which are calculated using Equation 1 and are higher than a threshold color error value, is higher than the threshold number of blocks. This is expressed by the following Equation:

$$n(S) \geq th_{num}$$

$$S = \{(i,j) | D(B_{ij}, B_{i_o j_o}) \geq th_{color\_diff}, i = i_o \pm 1, i_o, j = j_o \pm 1, j_o\} \quad (2)$$

where $th_{color\_diff}$ is the threshold color error value, and $th_{num}$ is the threshold number of surrounding blocks having higher color errors. As shown in Equation 2, the current block is selected if the number of surrounding blocks having higher color errors with respect to the current block is higher than $th_{num}$.

The first average RGB calculation unit 130 performs the operation on all the blocks output from the block exclusion unit 120, and calculates the average RGB values of the selected blocks, as described above.

The second average RGB calculation unit 140 selects a specific top percentage of bright blocks, and calculates the average RGB values of the selected blocks. Here, the 'specific top percentage of bright blocks' may be blocks that belong to the blocks output from the block exclusion unit 120 and have brightness values in the top 10% of brightness values. The actual top percentage may vary.

The third average RGB calculation unit 150 calculates average RGB values by performing color clustering on blocks based on the similarity of color information. In greater detail, the third average RGB calculation unit 150 sets the RGB value of a first input block as the average value of the first cluster of a color table, compares respective average values of clusters stored in the color table with the color of a found subsequent block, and adds the color of the currently found block to the cluster having the lowest color error, and then calculates the average value thereof if the lowest color error is lower than the threshold color error value. Meanwhile, if the color error between the two blocks is higher than the threshold color error value, another cluster is created in the color table, and the color of the currently found block is set as the average value of the created cluster. The third average RGB calculation unit 150 applies the above-described operation to all input blocks, and finally calculates the average RGB values for clusters registered in the color table.

Meanwhile, the chromaticity diagram conversion unit 160 converts the average RGB values, calculated by the average RGB calculation units 130, 140, and 150, into a chromaticity diagram that has x and y values in the CIE xyY color space. The chromaticity diagram was defined by the CIE. The chromaticity diagram is a diagram that represents chromatic points (points represented by chromaticity coordinates), with x and y being set to rectangular coordinates, on the basis of the fact that z is automatically determined when x are y are determined because the coordinates x, y and z of chromaticity have the following relationship: x+y+z=1.

The chromaticity diagram conversion unit 160 of the present invention converts the values in the RGB color space into a CIE XYZ value using the following Equation 3:

$$\begin{bmatrix} X \\ Y \\ Z \end{bmatrix} = \begin{bmatrix} 0.607 & 0.174 & 0.201 \\ 0.299 & 0.587 & 0.114 \\ 0.000 & 0.066 & 1.117 \end{bmatrix} \begin{bmatrix} R_N \\ G_N \\ B_N \end{bmatrix} \quad (3)$$

where $R_N$, $G_N$, and $B_N$ are values that are obtained by dividing R, G and B values by 255 and normalizing the resulting values. After the values in the RGB color space have been converted into the values in the CIE XYZ color space, the values in the CIE XYZ color space are converted into values in the CIE xyY space using the following Equation 4:

$$x = \frac{X}{X+Y+Z}, y = \frac{Y}{X+Y+Z}, Y = Y \quad (4)$$

The light source of an input image is estimated using values related to x and y, which belong to values obtained using Equation 4 and correspond to color signals. The light source estimation unit 170 for performing this operation will be described below.

Figure 3:
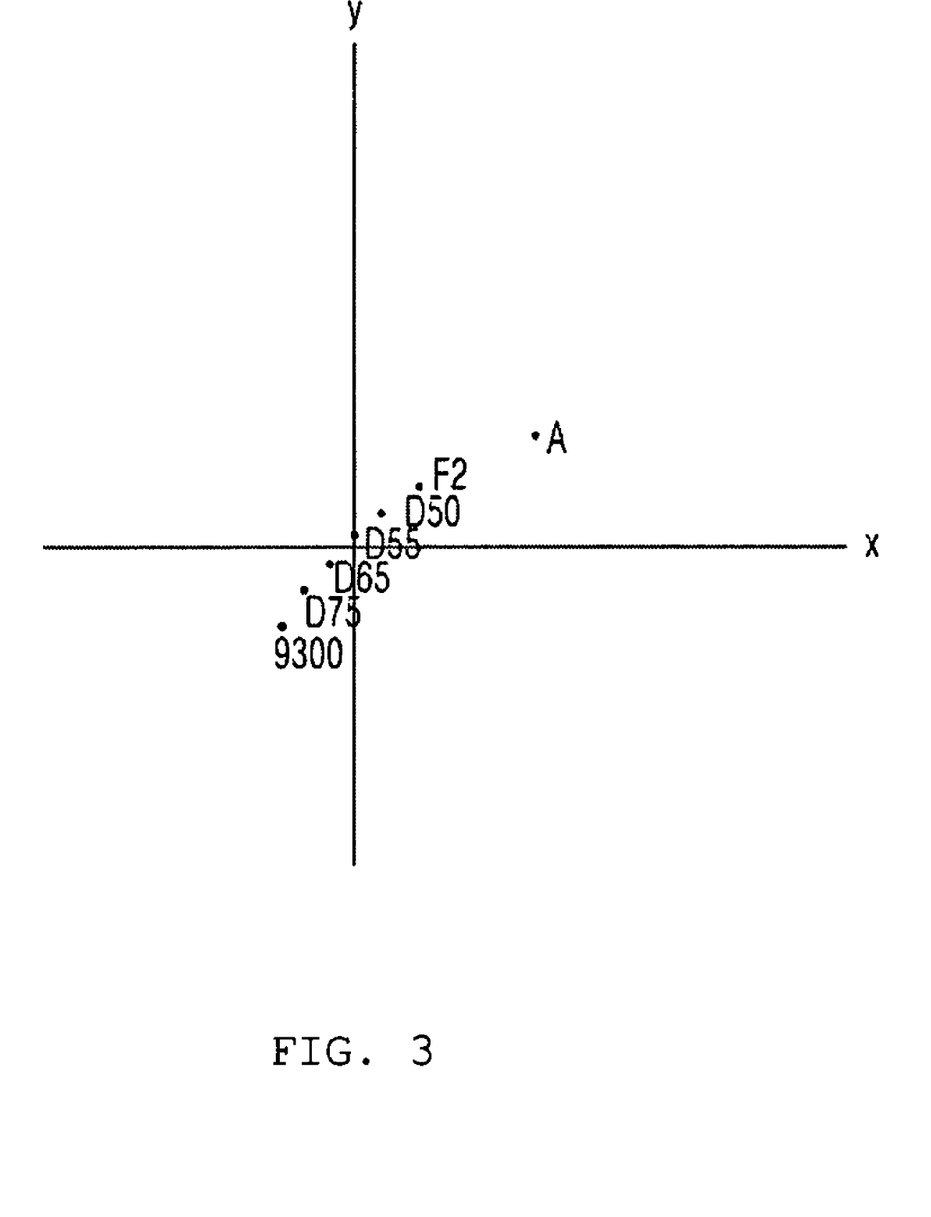
FIG. 3 is a chromaticity diagram of standard light sources defined by the International Commission on Illumination (CIE)

FIG. 3 illustrates the locations of the chromaticity diagram corresponding to well-known CIE standard light sources. The light source estimation unit 170 calculates the Euclidean distances (Eds) between the x and y values of the standard light sources and the CIE xyY color space (x, y) values of the average RGB values, which are calculated by the average RGB calculation units 130, 140, and 150, as shown in the following Equation 5:

$$E_d = \sqrt{(x-x_r)^2 + (y-y_r)^2} \quad (5)$$

where x and y are color signals obtained through the conversion of the average RGB values, and $x_r$ and $y_r$ are the color signals of the standard light sources. The light source estimation unit 170 of the present invention takes the standard light source having the shortest Ed as the light source that was used when the image was acquired, and selects the average RGB values corresponding to the case.

Thereafter, the final white balance gains are calculated from the selected average RGB values using the above-described light source estimation unit 170. The selected average RGB values reflect the degree of distortion of the color of the image by the light source, and the white balance gain values (hereinafter referred to as 'gain values') can be acquired using the selected average RGB values. In greater detail, the gain calculation unit 180 of the present invention calculates the white balance gain values so that R, G, and B all have the same value so as to correct the distortion of the image caused by the standard light source. In order to maintain the brightness value set through auto exposure, the gain values of respective R, G and B channels are set, as described below. First, the gain values of respective channels are calculated based on the lowest of R, G and B values, as shown in the following Equation 6:

$$\text{gain\_}X = X/\min(R,G,B) \quad (6)$$

where X is one of the average R, G, and B values, and gain_X are gain values corresponding to X.

When the gain values obtained as described above are applied to the correction of an image, the brightness value of the image is not maintained, but the image is darkened. Therefore, in order to compensate for this, the gain calculation unit 180 of the present invention causes the brightness value to be maintained by multiplying the gain values, obtained using Equation 6, by the ratio of the brightness value before correction using the gain values to the brightness value after correction using the gain values, as shown in the following Equation 7:

$$\text{gain\_}Y = \text{prev\_}Y/\text{curr\_}Y$$

$$\text{gain\_}X' = \text{gain\_}X \times \text{gain\_}Y \quad (7)$$

where prev_Y is Y values obtained using the average RGB values, and curr_Y is Y values obtained using the R, G and B values to which the gain values of the respective channels, obtained using Equation 6, are applied. gain_Y is the ratio of the brightness value before the application of the gain values to the brightness value after the application of the gain values. The final gain values gain_X' for respective channels R, G, and B are obtained by multiplying gain_X, corresponding to gain values for respective channels, which are obtained using Equation 6, or R, G, B gain values, by the ratio.

The image correction unit 190 corrects the image based on the final gain values.

Figure 4A:
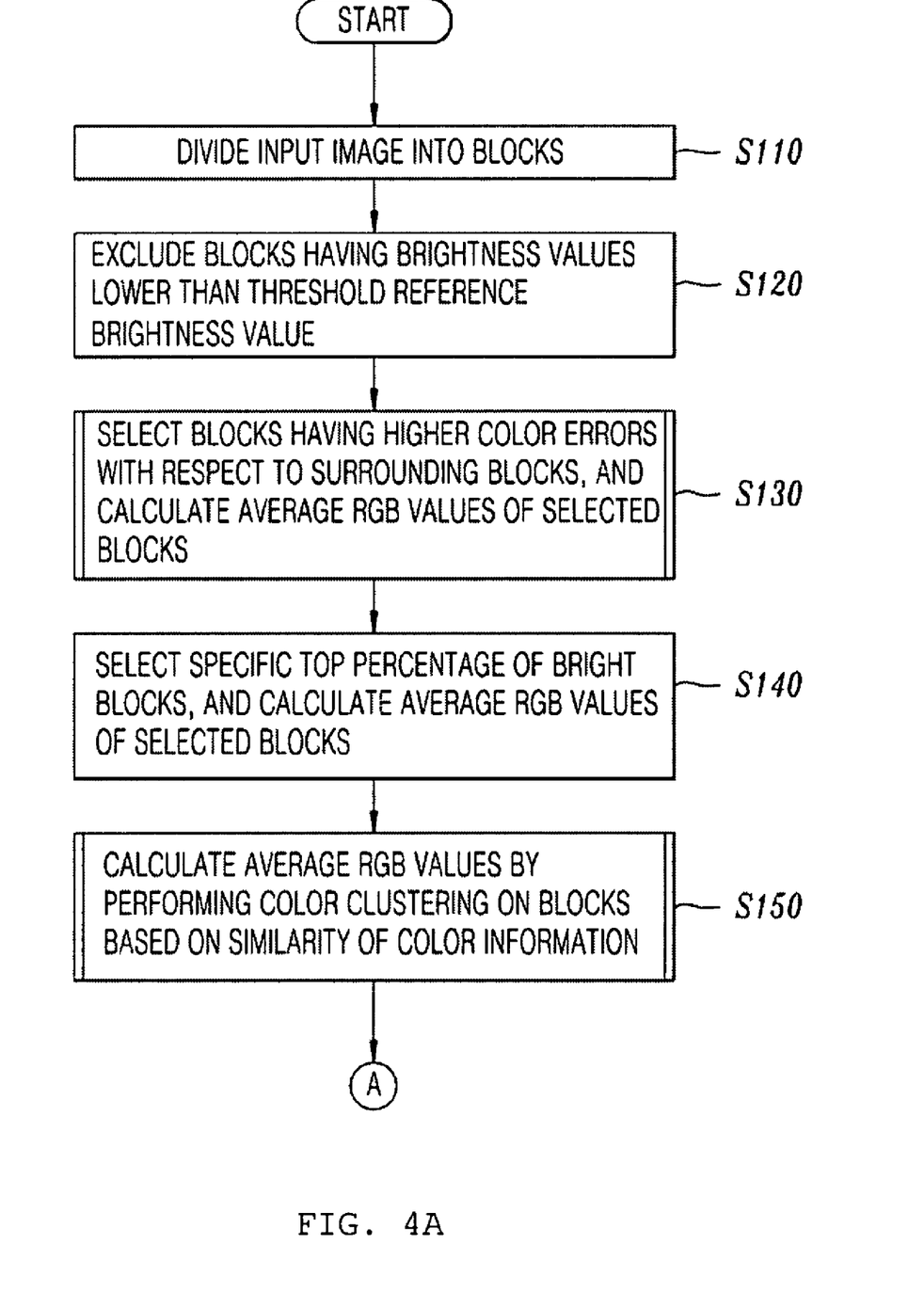
FIGS. 4A and 4B are schematic flowcharts showing a method of performing robust white balance according to the present invention.
Figure 4B:
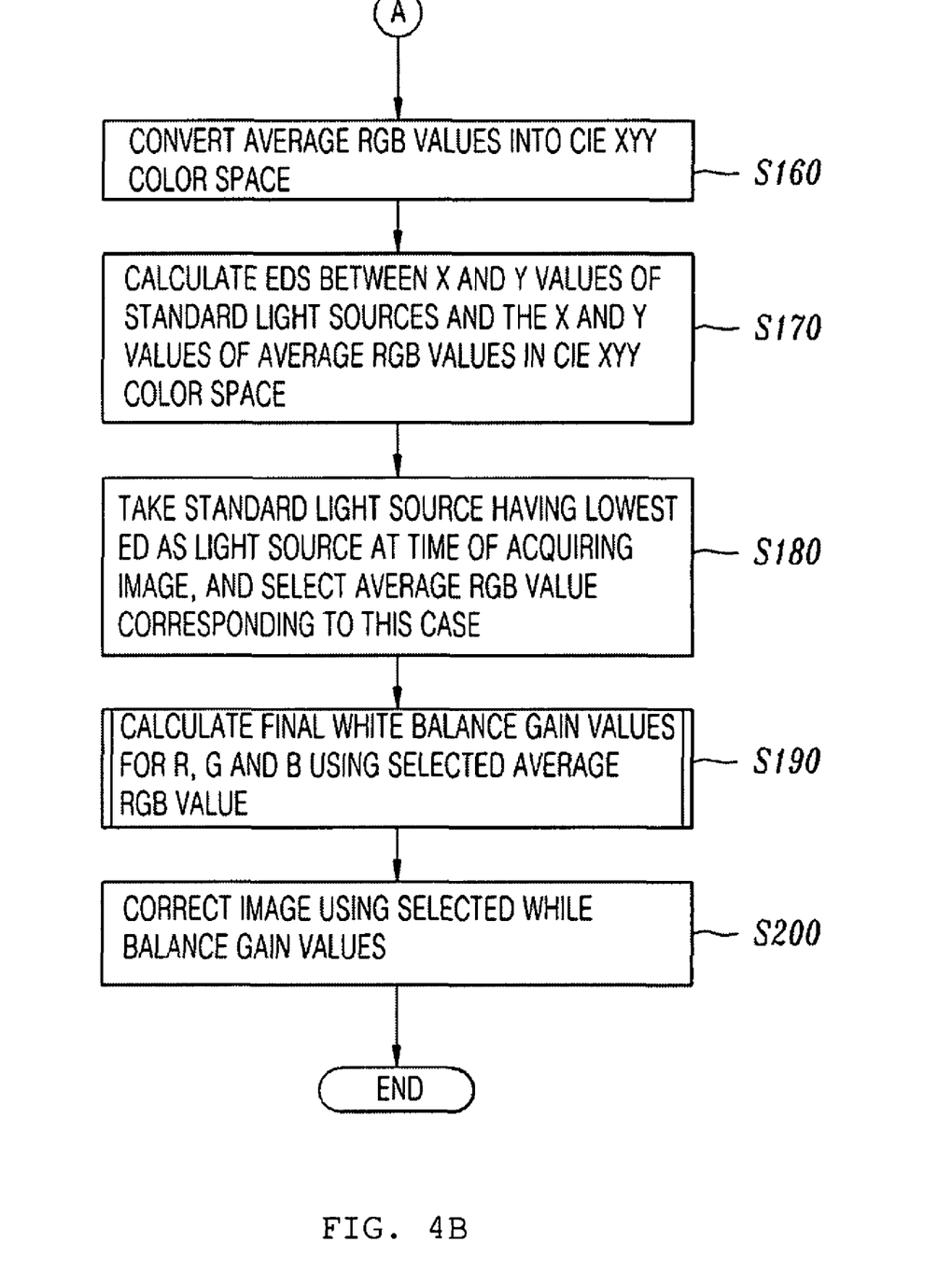

Based on the above-described construction, a method of performing robust white balance according to the present invention is described below. FIGS. 4A and 4B are flowcharts of the method of performing robust white balance.

First, an input image is divided into M×N blocks, as shown in FIG. 4A, in process S110, and blocks having brightness values lower than a threshold reference brightness value are excluded in process S120. In this case, 'exclusion' does not mean the deletion of blocks, but means the exclusion of blocks from the following processes, as described above. Meanwhile, if any one of the R, G, and B values of a block is lower than the threshold reference brightness value, the block is excluded.

Figure 5:
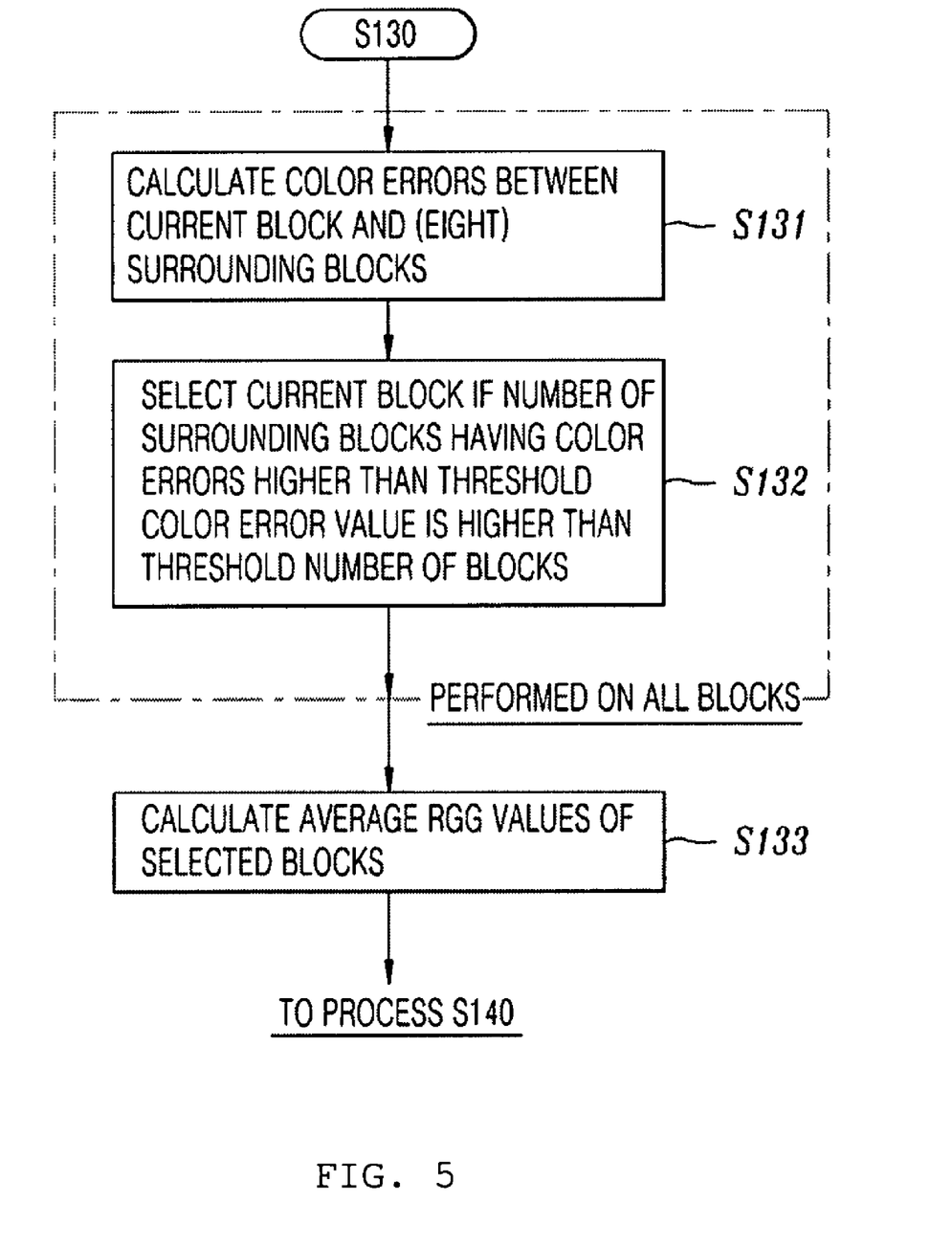
FIG. 5 is a detailed flowchart of process S130 of FIG. 4A.

Thereafter, blocks having higher color errors than (eight) surrounding blocks are selected, and the average RGB values of the selected blocks are calculated in block S130. In greater detail, in this process, as shown in FIG. 5, the color errors between the current block and eight blocks surrounding it are calculated at step S131, and the current block is selected if the number of surrounding blocks having color errors lower than the threshold color error value is higher than the threshold number of blocks at step S132. Steps S131 and S132 are performed on all of the blocks, through which the average RGB values of the selected blocks are calculated at step S133.

Thereafter, a specific top percentage of bright blocks is selected, and the average RGB values of the selected blocks are calculated in process S140.

Figure 6:
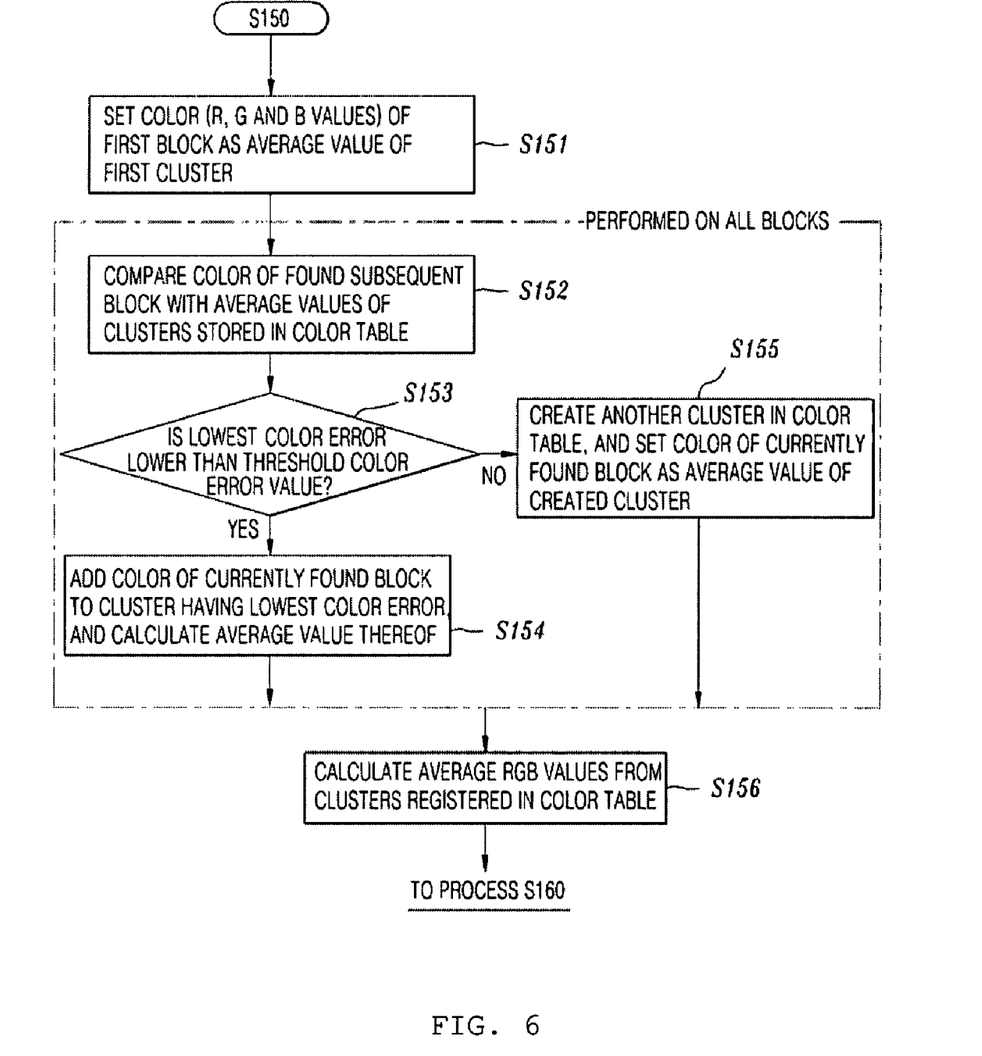
FIG. 6 is a detailed flowchart of process S150 of FIG. 4A.

Furthermore, color clustering is performed on the block based on the similarity of color information, and then the average RGB values are calculated in process S150. With reference to FIG. 6, this process will be described in detail below.

First, the color (RGB value) of the first input block is set as the average value of the first cluster of the color table at step S151, the color of a found subsequent block is compared with respective average values of clusters stored in the color table at step S152, and whether the lowest color error is lower than the threshold color error value is determined at step S153. If, as a result of the determination, the lowest color error is lower than the threshold color error value, the color of the currently found block is added to a cluster that belongs to the clusters registered in the color table and has the lowest color error, and the average value thereof is calculated at step S154. If, as a result of the determination at step S153, the lowest color error is equal to or higher than the threshold color error value, another cluster is created in the color table, and the color of the currently found block is set as the average value of the created cluster at step S155. The above-described steps S152 to S155 are performed on all of the input blocks, and final average RGB values are calculated from the clusters registered in the color table at step S156.

Thereafter, referring to FIG. 4B, average RGB values calculated through steps S130 to S150 are converted into the CIE xyY color space in process S160.

Thereafter, the Eds between the x and y values of the CIE standard light sources in the color space and the x and y values of the average RGB values in the CIE xyY color space are calculated in process S170, and the standard light source having the shortest Ed is taken as the light source that was used when the image was captured, and the average RGB values corresponding to this case are selected in process S180.

Figure 7:
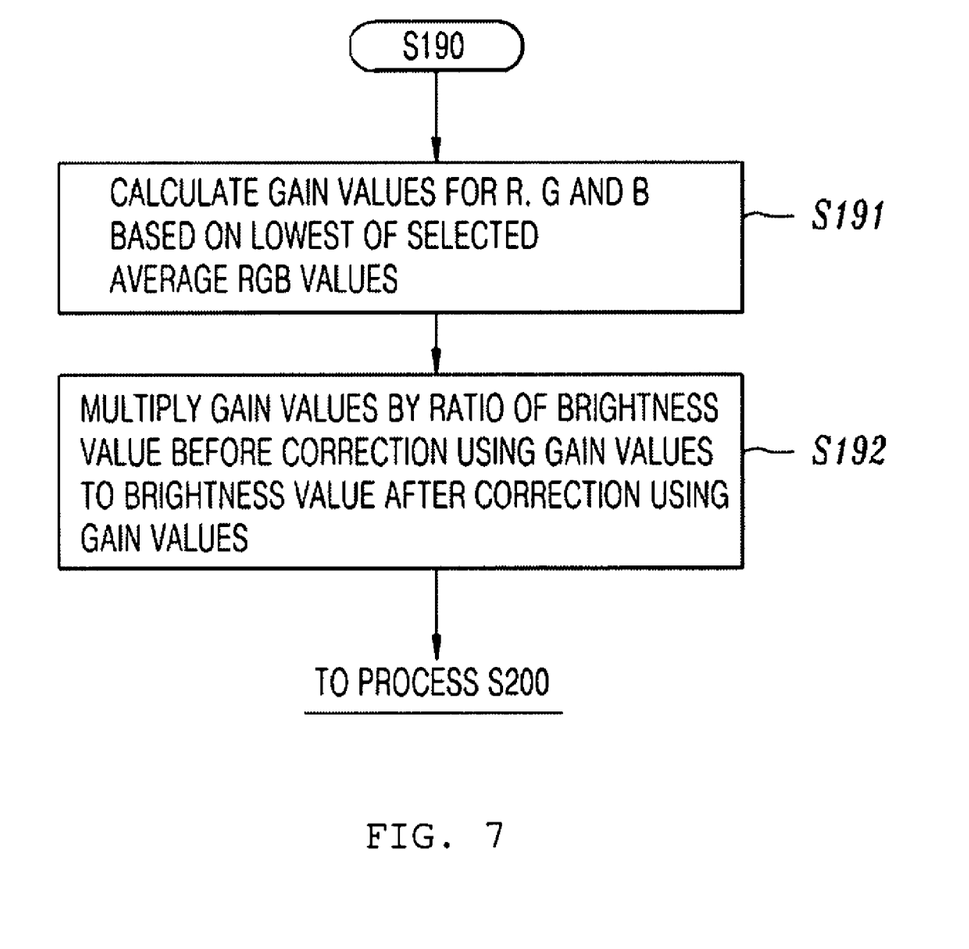
FIG. 7 is a detailed flowchart of process S190 of FIG. 4B.

Thereafter, final white balance gain values for respective R, G and B are calculated using the average RGB values, selected in process S180, in process S190. This process, as shown in FIG. 7, includes calculating gain values for respective R, G, and B based on the lowest of the selected average RGB values S191, and multiplying the gain values, obtained at step S191, by the ratio of the brightness value before correction using the calculated gain values to the brightness value after correction using the calculated gain values.

The image is corrected using the gain values, that is, white balance gain values, calculated in process S190, in process S200.

According to the present invention, block-based operations, rather than pixel-based operations, are performed on an image, and thus the speed of operation is increased. Furthermore, blocks having brightness values lower than the threshold reference brightness value are considered to be noise and are excluded from the operation, and thus the speed of the operation can be further increased.

Moreover, the estimation of the light source at the time of acquiring an image and the calculation of average RGB values used for white balance gain values are performed in various manners, so that the accuracy of white balance can be considerably increased compared to that of the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of performing robust white balance, comprising:
   a first process of dividing an input image into a plurality of blocks;
   a second process of selecting blocks having higher color errors with respect to surrounding blocks, and calculating average RGB values of the selected blocks;
   a third process of selecting a specific top percentage of bright blocks from the selected blocks of the second process, and calculating average RGB values of these selected blocks;
   a fourth process of calculating average RGB values by performing color clustering on the selected blocks from the third process based on similarity of color information;
   a fifth process of converting the average RGB values after color clustering of the fourth into CIE xyY color space;
   a sixth process of calculating Euclidean distances (Eds) between x and y values of standard light sources in a color space and x and y values of the average RGB values after color clustering of the fourth process in CIE xyY color space, and selecting an average RGB value having a shortest Euclidean distance (Ed); and
   a seventh process of calculating white balance gain values for R, G, and B using the selected average RGB value, and correcting the input image using the balance gain values.

2. The method as set forth in claim 1, wherein the first process comprises the step of excluding one or more blocks having brightness values lower than a threshold reference brightness value.

3. The method as set forth in claim 2, wherein the step is the step of excluding one or more blocks if any one of R, G, and B values of each of the one or more blocks is lower than the threshold reference brightness value.

4. The method as set forth in claim 1, wherein the second process comprises:
   a first step of calculating color errors between a current block and surrounding blocks;
   a second step of selecting the current block if a number of surrounding blocks, a lowest calculated color error of which is equal to or higher than a threshold color error value, is higher than a threshold number of blocks; and
   a third step of calculating average RGB values of selected blocks by performing the first and second steps on all input blocks.

5. The method as set forth in claim 1, wherein the specific top percent in the third process is 10%.

6. The method as set forth in claim 1, wherein the fourth process comprises:
   a first step of setting a color (R, G and B values) of a first one of the input blocks as an average value of a first cluster of the color table;
   a second step of determining whether a color error is lower than a threshold color error value by comparing a color of a found subsequent block with respective average values of clusters stored in the color table;
   a third step of, if the color error is determined to be lower than a threshold color error at the second step, adding the color of the currently found block to a cluster having a lowest color error, and calculating an average value thereof;
   a fourth step of, if the color error is determined to be equal to or higher than a threshold color error at the second step, creating another cluster in the color table, and setting the color of the currently found block as an average value of the created cluster; and
   a fifth step of calculating average RGB values of the clusters stored in the color table.

7. The method as set forth in claim 1, wherein the seventh process comprises:
   a first step of calculating gain values for R, G and B based on a smallest one of the selected average RGB values; and
   a second step of multiplying the gain values of the first step by a ratio of a brightness value before correction using the gain values to a brightness value after the correction using the gain values.

* * * * *